(12) United States Patent
Park et al.

(10) Patent No.: US 12,490,395 B2
(45) Date of Patent: Dec. 2, 2025

(54) FOLDABLE DISPLAY DEVICE

(71) Applicant: LG Display Co., Ltd., Seoul (KR)

(72) Inventors: Hosung Park, Seoul (KR); Minkyung Kim, Seoul (KR); Jungkyu Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 163 days.

(21) Appl. No.: 18/396,274

(22) Filed: Dec. 26, 2023

(65) Prior Publication Data

US 2024/0224450 A1 Jul. 4, 2024

(30) Foreign Application Priority Data

Dec. 30, 2022 (KR) .......................... 10-2022-0190083

(51) Int. Cl.
*H05K 5/02* (2006.01)
*F16C 11/04* (2006.01)

(52) U.S. Cl.
CPC ............ *H05K 5/0226* (2013.01); *F16C 11/04* (2013.01)

(58) Field of Classification Search
CPC .... G06F 1/1681; G06F 1/1652; G06F 1/1641; H05K 5/0226; H04M 1/0268; H04M 1/0237; H04M 1/022
See application file for complete search history.

(56) References Cited

U.S. PATENT DOCUMENTS

| | | | |
|---|---|---|---|
| 8,804,349 B2* | 8/2014 | Lee | G06F 1/1652 |
| | | | 361/679.01 |
| 2021/0076520 A1* | 3/2021 | Yen | H05K 5/0226 |
| 2021/0096596 A1 | 4/2021 | Cheng | |
| 2021/0165466 A1* | 6/2021 | Kang | G06F 1/1616 |
| 2021/0263565 A1* | 8/2021 | Yen | G06F 1/1681 |
| 2022/0221912 A1* | 7/2022 | Hsu | H04M 1/022 |
| 2023/0217616 A1* | 7/2023 | Park | F16C 11/04 |
| | | | 361/807 |

* cited by examiner

*Primary Examiner* — Abhishek M Rathod

(74) *Attorney, Agent, or Firm* — Birch, Stewart, Kolasch & Birch, LLP

(57) ABSTRACT

A foldable display device includes a display panel, a first set housing and a second set housing disposed to face each other in a first direction and respectively supporting two different portions of the display panel, and a hinge assembly disposed between the first set housing and the second set housings and for folding and unfolding the first set housing and the second set housing.

17 Claims, 9 Drawing Sheets

FOLDABLE DISPLAY DEVICE

CROSS-REFERENCE TO RELATED APPLICATIONS

This application claims priority to Korean Patent Application No. 10-2022-0190083 filed on Dec. 30, 2022, in the Korean Intellectual Property Office, the entire disclosure of which is incorporated herein by reference into the present application.

BACKGROUND

Technical Field

The present disclosure relates to a foldable display device, and more particularly, to a foldable display device having a hinge structure capable of being bidirectionally folded.

Description of the Related Art

Recently, portable terminals such as wireless terminals, personal digital assistants (PDAs), portable multimedia players (PMPs), and electronic notebooks have been miniaturized in size for portability. However, users require large-sized and wide screens of display parts because the users want to receive various types of information, such as text information, videos, still images, MP3s, and games through the screens of the portable terminals. However, because the miniaturization of the portable terminal leads to a decrease in size of the screen of the display part, there is a limitation in meeting the two requirements.

To overcome the above-noted limitations, recently, flexible display devices, such as bendable display devices or foldable display devices, have been developed.

The flexible display device can be implemented by configuring a substrate by using a plastic material. That is, the substrate of the flexible display device can comprise a flexible (e.g., elastic material). The flexible display device can be more conveniently carried by a user when the flexible display device is folded, and the flexible display device can implement a large screen when the flexible display device is unfolded. Therefore, the flexible display devices can be applied to various fields, such as televisions and monitors, as well as mobile devices such as mobile phones, electronic books, and electronic newspapers. Known foldable display device can only fold in a single direction, and there is need for foldable display devices that can fold in multiple directions to provide additional display configurations.

SUMMARY OF THE DISCLOSURE

An object to be achieved by one or more embodiments of the present disclosure is to provide an improved display device, which can address the limitations associated with the related art.

To implement a foldable display device among flexible display devices, the inventors of the present disclosure have invented a structure that uses a mechanism including a hinge provided in a region in which a display panel is folded. However, the inventors have recognized that a hinge structure in the related art can be folded only in one direction, and it is difficult to implement both an in-folding state in which a display panel is disposed inward and an out-folding state in which the display panel is disposed outward.

In addition, the inventors have recognized that even though a hinge capable of implementing both the in-folding state and the out-folding state is applied, it is difficult to cope with both damage to the display panel occurring in the in-folding state and damage to the display panel occurring in the out-folding state caused by repeated folding operations.

An object to be achieved by the present disclosure is to provide a bidirectionally foldable display device capable of implementing both an in-folding state and an out-folding state.

Another object to be achieved by the present disclosure is to provide a foldable display device capable of suppressing damage to a display panel caused when pressure is applied to the display panel exposed during a process of implementing an out-folding state. That is, the foldable display device of the present invention can be out-folded without causing damage to the display panel, or at least causing minimal damage to the display panel.

Still another object to be achieved by the present disclosure is to provide a foldable display device capable of minimizing the occurrence of cracks and/or creases in a display panel and inhibiting excessive stress from being applied to the display panel because of a small radius of curvature during an in-folding operation.

Yet another object to be achieved by the present disclosure is to provide a foldable display device capable of reducing strain applied to a portion of a display panel to which highest pressure is applied during an in-folding operation and an out-folding operation.

Still yet another object to be achieved by the present disclosure is to provide a foldable display device capable of improving durability by inhibiting a display panel and a support structure from being spaced apart from each other during an out-folding operation.

Another further object to be achieved by the present disclosure is to provide a foldable display device having excellent durability even though a folding operation is repeated.

Objects of the present disclosure are not limited to the above-mentioned objects, and other objects, which are not mentioned above, can be clearly understood by those skilled in the art from the following descriptions.

According to an aspect of the present disclosure, a foldable display device comprises a display panel, a first set housing and a second set housing disposed to face each other in a first direction and respectively supporting two different portions of the display panel, and a hinge assembly disposed between the first set housing and the second set housings and configured to fold and unfold the first set housing and the second set housing. The hinge assembly comprises a mid bar disposed between the first set housing and the second set housing and having a shape extending in a second direction perpendicular to the first direction, a first flap bar disposed between the first set housing and the mid bar, a second flap bar disposed between the second set housing and the mid bar, a bending coupler having a bent rod shape and having one side connected to the second flap bar, a semicircular disc connected to the other side of the bending coupler and including a flat portion having a planar shape, and an arc portion having a curved arc surface, the semicircular disc being configured to rotate about a rotation axis, a gear housing configured to accommodate the semicircular disc and accommodate an end of the mid bar, a spring member disposed at the end of the mid bar and accommodated in the gear housing, a first coupler and a second coupler respectively including first connection portions protruding toward the first flap bar and a second flap bar in the second direction, and second connection portions protruding in a direction opposite to the direction of the first connection portions in the second direction, and a first gear arm and a second gear arm coupled respectively with the second connection portion of the first coupler and the second connection portion of the second coupler.

Other detailed matters of the exemplary embodiments are included in the detailed description and the drawings.

The present disclosure can implement the bidirectionally foldable display device capable of performing both the in-folding operation and the out-folding operation.

According to the present disclosure, the rounded quadrangular (e.g., rounded rectangle) edge can be formed in the folding area during the out-folding operation, thereby suppressing damage to the display panel caused by pressure applied to the display panel. That is, due to a shape and design of the folding area, pressure and/or force applied to the display panel during various folding operations can be completely suppressed or at least greatly reduced.

According to the present disclosure, the display panel can be disposed in an omega ($\Omega$) shape during the in-folding operation, the radius of curvature of the display panel in the folding area can be increased, and the stress applied to the folded display panel can be reduced.

According to the present disclosure, the support body, which varies in position, can be used to support the display panel in the display area in both the out-folding state and the in-folding state, thereby inhibiting the display panel from being creased and/or cracked.

According to the present disclosure, the reliability of the display device can be improved and damage to the display panel can be minimized even though the folding operation is repeated.

According to the present disclosure, the connection structure always constantly maintains folding angles of the plurality of constituent elements, which constitute the support body, during the out-folding operation. Therefore, it is possible to improve the durability against external impact by minimizing separation or spacing between the support body and the display panel during the out-folding operation.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
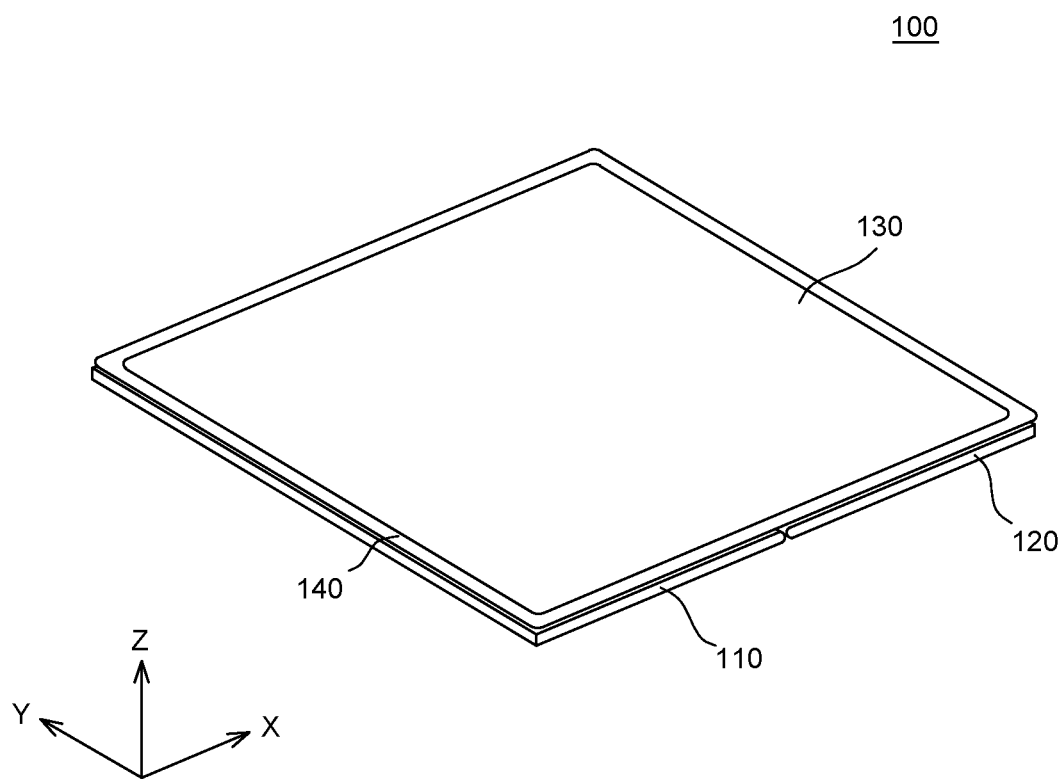
FIG. 1 is a perspective view of a foldable display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," "comprising" and "consist of," etc. used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "over," "above", "below", "under" and "next", one or more parts can be positioned between the two parts unless the terms are used with the term "immediately" or "directly".

When an element or layer is disposed "on" or "over" another element or layer, one or more additional layers or elements can be interposed directly on the other element or therebetween.

Although the terms "first", "second", and the like are used for describing various components, these components are not confined by these terms, and may not define order or sequence. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated. Further, the term "exemplary" has the same or similar meaning as and is interchangeably used with the term "example."

The features of various embodiments of the present disclosure can be partially or entirely adhered to or combined with each other and can be interlocked and operated in technically various ways, and the embodiments can be carried out independently of or in association with each other.

Hereinafter, a foldable display device according to exemplary embodiments of the present disclosure will be described in detail with reference to accompanying drawings. All the components of each display device according to all embodiments of the present disclosure are operatively coupled and configured.

Figure 2:
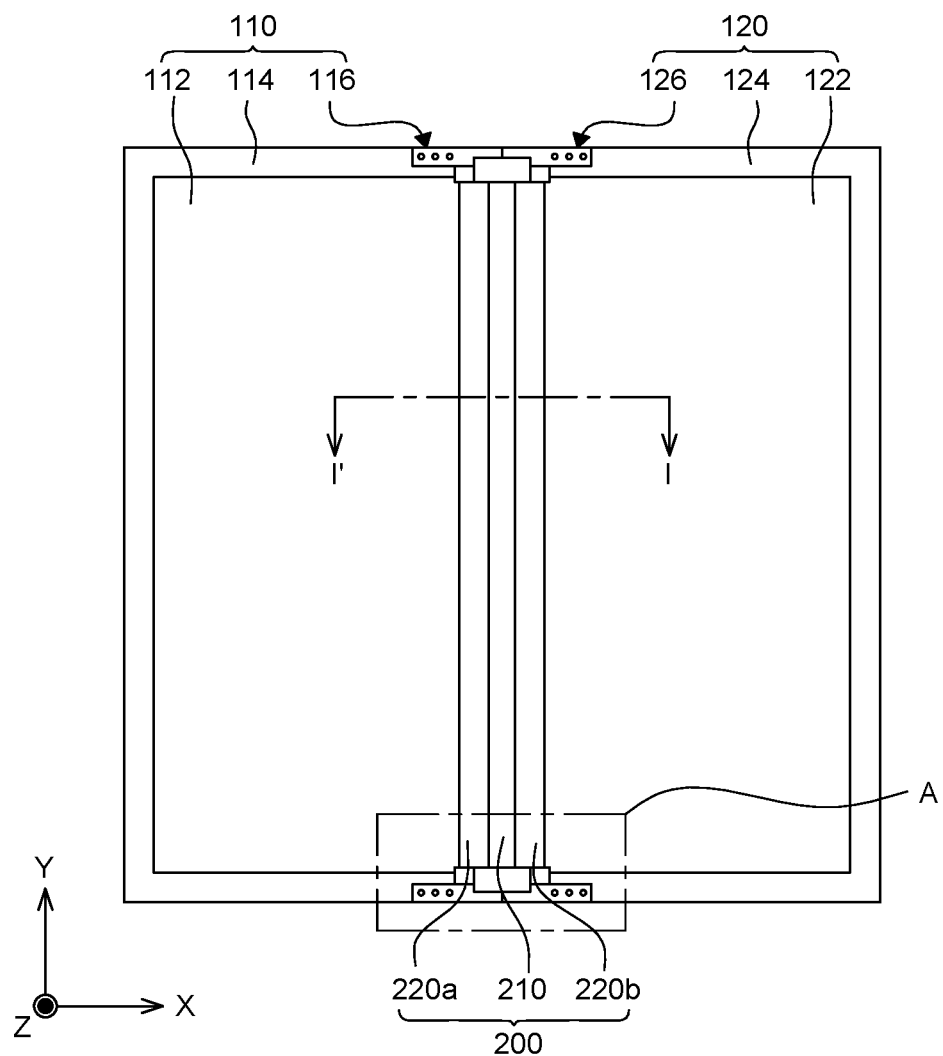
FIG. 2 is a top plan view illustrating a part of a configuration of the foldable display device according to the embodiment of the present disclosure.

FIGS. 1 and 2 are views for explaining (i.e., illustrating) a foldable display device according to an embodiment of the present disclosure. FIG. 1 is a perspective view of the foldable display device according to the embodiment of the present disclosure. FIG. 2 is a top plan view illustrating a part of a configuration of the foldable display device according to the embodiment of the present disclosure.

With reference to FIGS. 1 and 2, a foldable display device 100 according to an embodiment of the present disclosure can include set housings 110 and 120, a hinge assembly 200, a display panel 130, and a bezel cover 140.

For convenience of description, FIGS. 1 and 2 briefly illustrate components of the foldable display device 100. However, various components for substantially operating the foldable display device 100 can be further included.

The foldable display device 100 according to the embodiment of the present disclosure can be folded at a particular angle (e.g., any particular angle) in accordance with a user's intention. In addition, the foldable display device can be completely folded or unfolded in accordance with the user's intention. The foldable display device can be unfolded or folded in an in-folding state or an inner-folding state in which the display panel is disposed inward. Alternatively, the foldable display device can be unfolded or folded in an out-folding state in which the display panel is disposed outward. The foldable display device 100 according to the embodiment of the present disclosure is a bidirectionally foldable display device capable of being bidirectionally folded and freely implementing the in-folding state and the out-folding state in accordance with the user's intention.

The set housings 110 and 120 can be a set of external covers and the set housings 110 and 120 can support or accommodate various constituent elements of the foldable display device 100, including the display panel 130. The set housings 110 and 120 can include a first set housing 110 at the left side (e.g., a first lateral side), and a second set housing 120 at the right side (e.g., a second lateral side opposite to the first lateral side). However, the present disclosure is not limited thereto.

The first set housing 110 and the second set housing 120 can be disposed to be spaced apart from each other with the hinge assembly 200 interposed therebetween. The first set housing 110 and the second set housing 120 can be disposed to face each other in a width direction (an X-axis direction or a first direction) with the hinge assembly 200 interposed therebetween. In addition, the first set housing 110 and the second set housing 120 can be respectively disposed in one side area and the other side area in which the foldable display device 100 of according to the embodiment of the present disclosure is folded and unfolded. That is, the foldable display device 100 according to the embodiment of the present disclosure can be folded and unfolded about any area between the first set housing 110 and the second set housing 120 by an external force applied by the user.

With reference to FIG. 2, the set housings 110 and 120 can each include a support body, a frame, and a fastening part. Specifically, the first set housing 110 includes a first support body 112, a first frame 114, and a first fastening part 116, and the second set housing 120 includes a second support body 122, a second frame 124, and a second fastening part 126. The first fastening part 116 and the second fastening part 126 can be in the form of a flange or bracket.

The first support body 112 and the second support body 122 can each be a base member for supporting various constituent elements of the foldable display device 100 including the display panel 130. The first support body 112 and the second support body 122 can be disposed to be spaced apart from each other with a mid bar 210, a first flap bar 220a, and a second flap bar 220b interposed therebetween. The mid bar 210, first flap bar 220a, and second flap bar 220b can each extend an entire width (e.g., or less than an entire width) in a Y-direction of the set housings 110 and 120.

The first frame 114 and the second frame 124 are a set of internal frames that surround and accommodate various types of constituent elements of the foldable display device 100. The first frame 114 and the second frame 124 can respectively surround edges of the first and second support bodies 112 and 122. Specifically, the first frame 114 surrounds three edge sides of the first support body 112 except for the edge facing the hinge assembly 200. In addition, the second frame 124 surrounds three edge sides of the second support body 122 except for the edge facing the hinge assembly 200.

The support body and the frame can have structures that are provided separately and assembled to each other. Alternatively, the support body and the frame can have a single structure connected continuously. FIG. 2 illustrates the structure in which the first support body 112 and the first frame 114 are configured as a single structure connected continuously, and the second support body 122 and the second frame 124 are configured as a single structure connected continuously. However, the present disclosure is not limited thereto.

The first fastening part 116 and the second fastening part 126 are provided on the first frame 114 and the second frame 124 and are coupled to the hinge assembly 200. The first fastening part 116 is provided at upper and lower ends of the first frame 114 disposed adjacent to the first flap bar 220a, and the second fastening part 126 is provided at upper and lower ends of the second frame 124 disposed adjacent to the second flap bar 220b. The first fastening part 116 and the second fastening part 126 are respectively fastened to a first gear arm 290a and a second gear arm 290b of the hinge assembly 200 that will be described below. The first fastening part 116 and the second fastening part 126 can be disposed to face each other in a folded state.

The hinge assembly 200 is connected to the first set housing 110 and the second set housing 120 and the hinge assembly 200 implements folding and unfolding operations of the foldable display device 100. The hinge assembly 200 can include the mid bar 210 and the first and second flap bars 220a and 220b. Specific structures and functions of the hinge assembly 200 will be described below with reference to FIGS. 3 to 4E.

The display panel 130 is disposed on the first set housing 110 and the second set housing 120. Specifically, the display panel 130 can be disposed on one surface (e.g., a first surface, such as a first top surface) of the first support body 112 and one surface (e.g., a first surface, such as a first top surface) of the second support body 122. One of various display panels 130, such as organic light-emitting display panels and liquid crystal display panels can be used as the display panel 130, and the present disclosure is not limited thereto, and any known type of display panel can be used.

The display panel 130 can include a plurality of subpixels that serves to display images to the user, as known in the art. In the display panel, a plurality of scan lines and a plurality of data lines can intersect one another, and each of the plurality of subpixels can be connected to the scan line and the data line. In addition, each of the plurality of subpixels can be connected to a high-potential power line, a low-potential power line, an initialization signal line, a light emission control signal line, and the like.

The subpixel is a minimum unit that constitutes a screen. Each of the plurality of subpixels can include a light emitting element and a pixel circuit for driving the light emitting element. Different light-emitting elements can be defined depending on the types of display panels 130. For example, in a case in which the display panel 130 is an organic light-emitting display panel, the light-emitting element can be an organic light-emitting element including an anode, a light-emitting part, and a cathode. Hereinafter, the description is made on the assumption that the light emitting element is the organic light emitting element.

However, the disclosure is not limited by the type of light emitting element.

The pixel circuit refers to a circuit for controlling an operation of the light emitting element. For example, the pixel circuit can include a plurality of transistors and a capacitor. However, the present disclosure is not limited thereto.

In addition, the display panel 130 can have flexibility so that the display panel 130 can be folded or unfolded when the foldable display device 100 is folded or unfolded.

The foldable display device 100 can be folded so that a particular folding angle is defined between the first set housing 110 and the second set housing 120. That is, FIGS. 1 and 2 illustrate that the foldable display device is completely unfolded so that an angle of 180° is defined between the first set housing 110 and the second set housing 120. However, the foldable display device 100 can be folded at a particular angle. In this case, the display panel 130, on which the first set housing 110 and the second set housing 120 are disposed, can be folded at a particular angle when the first set housing 110 and the second set housing 120 are folded.

In addition, a particular folding angle of the foldable display device 100 can be maintained by a holding force provided from the hinge assembly 200. That is, the first set housing 110 and the second set housing 120 can be fixed in a state in which a particular folding angle is maintained by the hinge assembly 200. Therefore, the foldable display device 100 can be folded at a particular angle in accordance with the user's intention and kept folded at the particular angle by the holding force of the hinge assembly 200.

The bezel cover 140 can be disposed on a top surface of the display panel 130 and cover a top surface bezel of the display panel 130. The bezel cover 140 can be integrated to cover the entire bezel of the display panel 130. However, the present disclosure is not limited thereto. That is, the bezel cover 140 can be divided into a first bezel cover at the left side and a second bezel cover at the right side.

Hereinafter, the specific structures and functions of the hinge assembly 200 will be described in detail with reference to FIGS. 3 to 4E.

Figure 3:
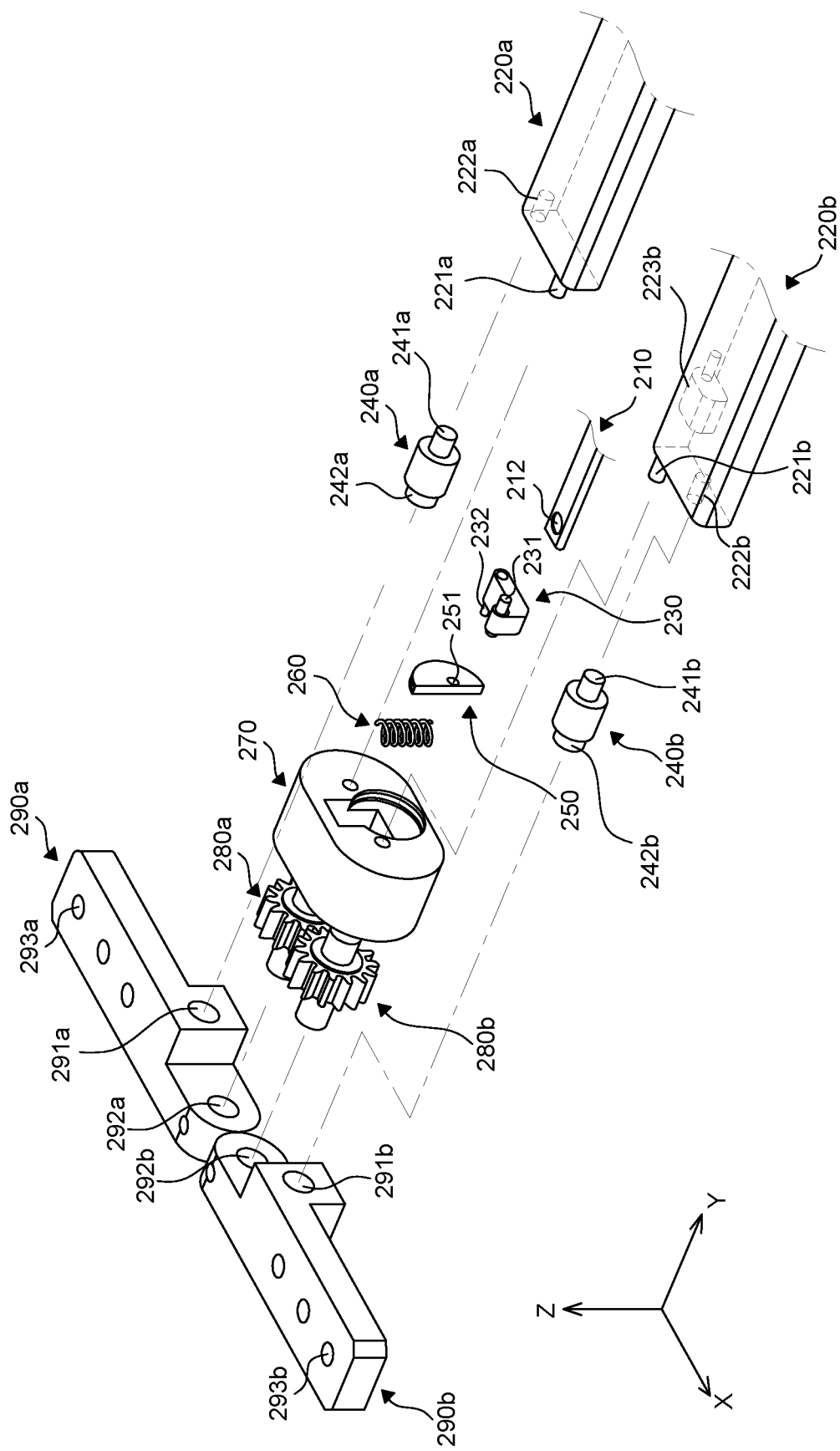
FIG. 3 is an enlarged exploded perspective view of part A in FIG. 2.
Figure 4A:
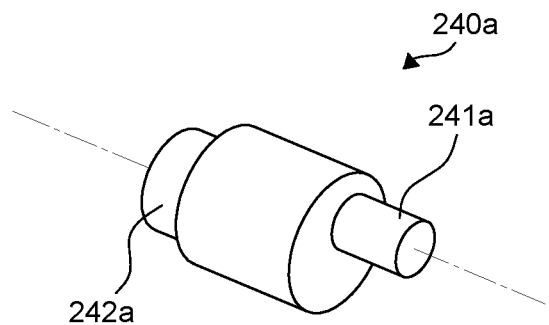
FIG. 4A is a perspective view illustrating a structure of a first coupler of the foldable display device according to the embodiment of the present disclosure.
Figure 4B:
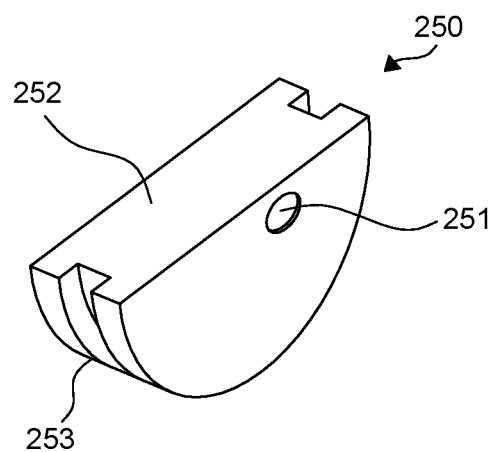
FIG. 4B is a perspective view illustrating a structure of a semicircular disc of the foldable display device according to the embodiment of the present disclosure.
Figure 4C:
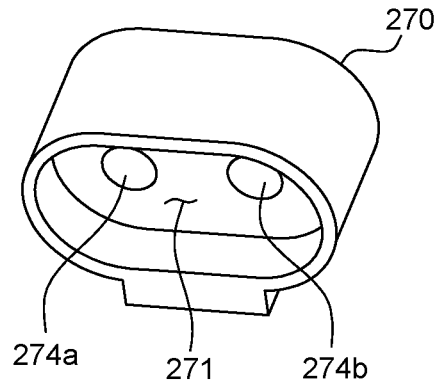
FIG. 4C is a perspective view illustrating one side portion of a gear housing of the foldable display device according to the embodiment of the present disclosure.
Figure 4D:
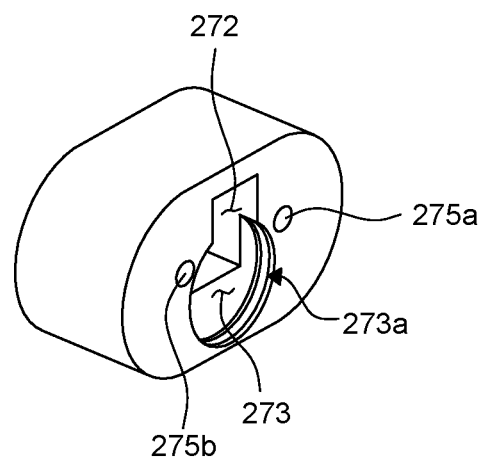
FIG. 4D is a perspective view illustrating the other side portion of the gear housing of the foldable display device according to the embodiment of the present disclosure.

FIG. 3 is an enlarged exploded perspective view of part A in FIG. 2. FIG. 3 is an exploded perspective view of the hinge assembly 200. FIG. 4A is a perspective view illustrating a structure of a first coupler of the foldable display device according to the embodiment of the present disclosure. FIG. 4B is a perspective view illustrating a structure of a semicircular disc of the foldable display device according to the embodiment of the present disclosure. FIG. 4C is a perspective view illustrating one side portion of a gear housing of the foldable display device according to the embodiment of the present disclosure. FIG. 4D is a perspective view illustrating the other side portion of the gear housing of the foldable display device according to the embodiment of the present disclosure. FIG. 4E is a perspective view illustrating a structure in which constituent elements of the foldable display device according to the embodiment of the present disclosure are coupled in the gear housing.

Figure 4E:
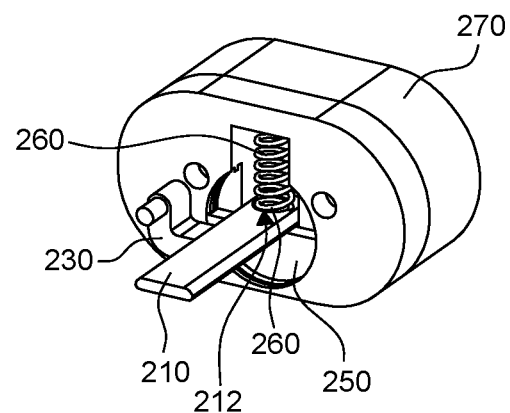
FIG. 4E is a perspective view illustrating a structure in which constituent elements of the foldable display device according to the embodiment of the present disclosure are coupled in the gear housing.

With reference to FIGS. 3 to 4E, the hinge assembly 200 according to the embodiment of the present disclosure includes the mid bar 210, the first flap bar 220a, the second flap bar 220b, bending couplers 230, first couplers 240a, second couplers 240b, semicircular discs 250, spring members 260, gear housings 270, first rotary gears 280a, second rotary gears 280b, the first gear arms 290a, and the second gear arms 290b. FIG. 3 illustrates only one of the two hinge assemblies of the present invention, with each hinge assembly being disposed on a respective side of the foldable display device 100.

With reference to FIG. 2, the mid bar 210 is disposed between the first set housing 110 and the second set housing 120. The mid bar 210 can have a flat shape elongated in a longitudinal direction (a Y-axis direction or a second direction). A top surface of the mid bar 210 has a flat shape to support the display panel 130.

With reference to FIG. 3, the mid bar 210 can be elongated in the Y-axis direction to the gear housing 270 and further protrude than the first flap bar 220a and the second flap bar 220b. Two opposite side portions of the mid bar 210 based on the Y-axis direction can be inserted into second accommodation portions 272 formed in the gear housings 270. In this case, a fixing groove 212 can be formed in a top surface of the mid bar 210 inserted into the second accommodation portion 272 of the gear housing 270. When the mid bar 210 moves upward or downward, the spring member 260 can apply pressure in a Z-axis direction while the fixing groove 212 suppresses the separation of the spring member 260.

The mid bar 210 can move upward or downward in a thickness direction (the Z-axis direction or a third direction). The mid bar 210 can move upward or downward to fold or unfold the first set housing 110 and the second set housing 120. The upward or downward movement of the mid bar 210 will be described below with reference to a folding embodiment of the foldable display device according to the embodiment of the present disclosure.

The first flap bar 220a and the second flap bar 220b are disposed at two opposite sides of the mid bar 210 based on the width direction (X-axis direction). With reference to FIG. 2, the first flap bar 220a is disposed between the mid bar 210 and the first set housing 110, and the second flap bar 220b is disposed between the mid bar 210 and the second set housing 120. The first flap bar 220a and the second flap bar 220b can each support a part of the display panel 130 and the first flap bar 220a and the second flap bar 220b can serve as a hinge. The first flap bar 220a and the second flap bar 220b can each rotate about a rotation axis defined in the longitudinal direction (Y-axis direction) and each of the first flap bar 220a and the second flap bar 220b can be positioned at one side adjacent to the mid bar 210.

Figure 5A:
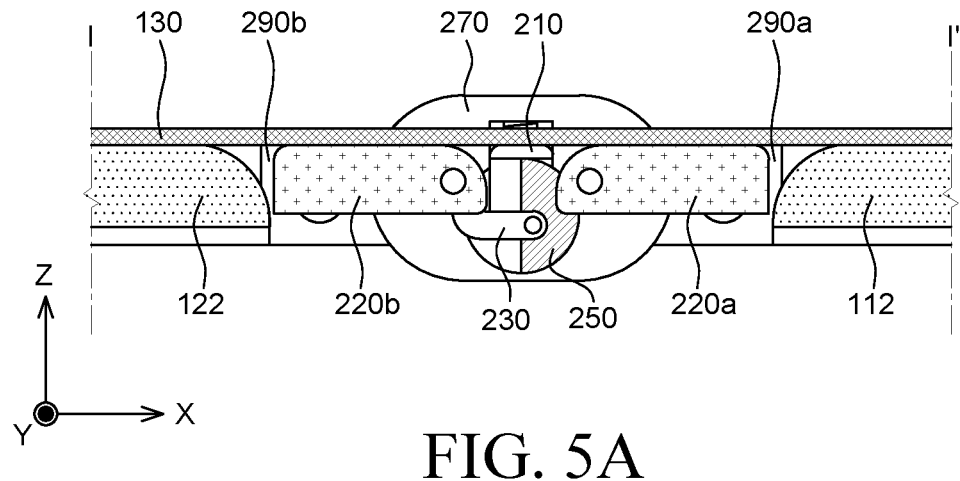
FIG. 5A is a cross-sectional view taken along line I-I' in FIG. 2 and illustrating an unfolding state of the foldable display device according to the embodiment of the present disclosure.
Figure 5B:
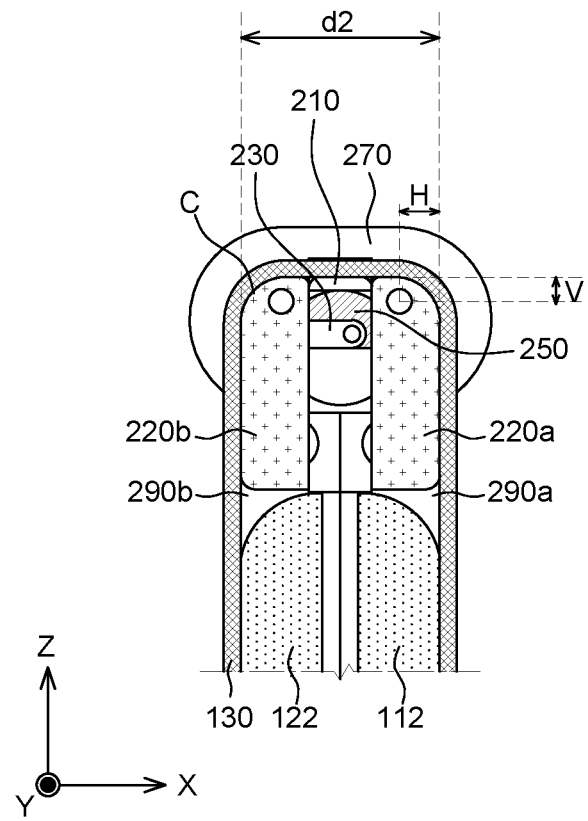
FIG. 5B is a schematic cross-sectional view illustrating an out-folding state of the foldable display device according to the embodiment of the present disclosure.

The first flap bar 220a and the second flap bar 220b can each have a blade shape (e.g., a flat bar, a flat or planar rectangular or square shaped bar, etc.). With reference to FIG. 3, the first flap bar 220a and the second flap bar 220b can each have a constant thickness and can have an arc shape in which the thickness is reduced at one side portion adjacent to the mid bar 210, as shown in FIGS. 5A and 5B, for example. That is, one side portion of the first flap bar 220a and one side portion of the second flap bar 220b can each have a convexly curved surface. The convexly curved surfaces of the first flap bar 220a and the second flap bar 220b can face one another when the foldable display device is in an unfolded state, as shown in FIG. 5A. Because one side portion of the first flap bar 220a and one side portion of the second flap bar 220b each have a curved surface, the first flap bar 220a and the second flap bar 220b are not affected by the mid bar 210 during a process in which the in-folding operation is performed on the first flap bar 220a and the second flap bar 220b. Further, the first flap bar 220a and the second flap bar 220b can support the display panel 130 when the out-folding operation is performed.

The other side portion of the first flap bar 220a and the other side portion of the second flap bar 220b can each have various shapes. FIGS. 3, 5A and 5B illustrate a quadrangular structure in which the other side portion of the first flap bar 220a and the other side portion of the second flap bar 220b, which are respectively adjacent to the first set housing 110 and the second set housing 120, each have a rounded edge. However, the present disclosure is not limited thereto. The other side portion of the first flap bar 220a and the other side portion of the second flap bar 220b can each have an arc shape and have a smaller radius of curvature than each of one side portion of the first flap bar 220a and one side portion of the second flap bar 220b. Alternatively, the other side portion of the first flap bar 220a and the other side portion of the second flap bar 220b can each have an edge having a quadrangular or polygonal angled shape or a splined shape.

First protruding portions 221a and 221b are respectively formed on one side portion (e.g., a first side portion) of the first flap bar 220a and one side portion (e.g., a first side portion) of the second flap bar 220b adjacent to the mid bar 210 in the width direction (X-axis direction). The first protruding portions 221a and 221b can be connected to the gear housing 270 adjacent to the first protruding portions 221a and 221b in the longitudinal direction (Y-axis direction). The first protruding portions 221a and 221b are connected to fifth insertion grooves 275a and 275b of the gear housing 270. The first protruding portions 221a and 221b can respectively serve as rotation axes of the first flap bar 220a and the second flap bar 220b. The in-folding state can be made as the other side portion of the first flap bar 220a and the other side portion of the second flap bar 220b rotate upward about the first protruding portions 221a and 221b, respectively. The out-folding state can be made as the other side portion of the first flap bar 220a and the other side portion of the second flap bar 220b rotate downward about the first protruding portions 221a and 221b, respectively.

First insertion grooves 222a and 222b are respectively formed in the other side portion (e.g., a second side portion) of the first flap bar 220a and the other side portion (e.g., a second side portion) of the second flap bar 220b respectively adjacent to the first set housing 110 and the second set housing 120. The first insertion grooves 222a and 222b can respectively be connected to the first coupler 240a and the second coupler 240b adjacent to the first insertion grooves 222a and 222b in the longitudinal direction (Y-axis direction). The first insertion grooves 222a and 222b are respectively connected to the first coupler 240a and the second coupler 240b, and are respectively connected to the first gear arm 290a and the second gear arm 290b, such that the first flap bar 220a and the second flap bar 220b operates in conjunction with the motions of the first and second gear arms 290a and 290b. Specifically, in case that the user performs the in-folding operation on the first set housing 110 and the second set housing 120, the other side portion of the first flap bar 220a and the other side portion of the second flap bar 220b, which respectively have the first insertion grooves 222a and 222b, can rotate upward. In addition, in case that the out-folding operation is performed on the first set housing 110 and the second set housing 120, the other side portion of the first flap bar 220a and the other side portion of the second flap bar 220b can rotate downward.

Meanwhile, a second insertion groove 223b is formed in one side portion of the second flap bar 220b adjacent to the mid bar 210. The second insertion groove 223b can be connected to the bending coupler 230. With reference to FIG. 3, the second insertion groove 223b is formed in an area adjacent to the first protruding portion 221b of the second flap bar 220b. Unlike the first insertion grooves 222a and 222b formed to be concave in the Y-axis direction from the end adjacent to the gear housing 270, the second insertion groove 223b is formed to be concave (e.g., has a concave shape) in the X-axis direction from one side portion of the second flap bar 220b adjacent to the mid bar 210. In addition, the second insertion groove 223b can have an accommodation space formed in the second flap bar 220b so that the bending coupler 230 is not withdrawn after the bending coupler 230 is inserted into the second insertion groove 223b. The second insertion groove 223b can have a shape that matches a shape of the bending coupler 230, such that when the bending coupler 230 is inserted into the second insertion groove 223b, it remains fixed (e.g., by a press-fit connection) during a folding and unfolding operation of the foldable display device 100. That is, the second insertion groove 223b has a structure having a narrow inlet and the accommodation space so that the bending coupler 230 is not withdrawn when the second flap bar 220b rotates. Meanwhile, the second insertion groove 223b can have a guide groove so that the bending coupler 230 does not restrict the motion of the second flap bar 220b when the second flap bar 220b rotates. For example, as illustrated in FIG. 3, the second insertion groove 223b has a shape formed by opening a bottom surface of the second flap bar 220b, such that the bending coupler 230 can move during the folding operation. In addition, a top surface of the second insertion groove 223b can have an arc shape so that the bending coupler 230 can rotate in the second insertion groove 223b.

The second insertion groove 223b can be formed only in the second flap bar 220b without being formed in the first flap bar 220a. In the foldable display device according to the embodiment of the present disclosure, only the second flap bar 220b of the pair of flap bars 220a and 220b is connected to the bending coupler 230, such that the bending coupler 230 is used to control the rotation of the semicircular disc 250 and the upward or downward movement of the mid bar 210 in accordance with the folding operation of the second flap bar 220b. In this case, as described below with reference to FIG. 5B, based on the unfolding state, a central axis of the second insertion groove 223b can be formed to be closer to a rotation axis of the semicircular disc 250 than a central axis of the first insertion groove 222a to the rotation axis of the semicircular disc 250. The motion of the semicircular disc 250 and the motion of the mid bar 210 will be described below with reference to the folding embodiment of the foldable display device according to the embodiment of the present disclosure.

The first and second and 240b are couplers 240a respectively disposed between the first and second flap bars 220a and 220b and the first and second gear arms 290a and 290b. The first coupler 240a can connect the first flap bar 220a and the second gear arm 290b, and the second coupler 240b can connect the second flap bar 220b and the second gear arm 290b.

With reference to FIGS. 3 and 4A together, the first and second couplers 240a and 240b respectively include first connection portions 241a and 241b protruding toward the first and second flap bars 220a and 220b so as to be inserted into the first insertion grooves 222a and 222b of the first and second flap bars 220a and 220b. The first and second couplers 240a and 240b respectively include second connection portions 242a and 242b protruding toward the first and second gear arms 290a and 290b so as to be inserted into first fastening grooves 291a and 291b of the first and second gear arms 290a and 290b. In this case, the first connection portions 241a and 241b and the second connection portions 242a and 242b have different central axes. In addition, the first connection portions 241a and 241b can have a circular cross section and can have different diameters (e.g., a larger size) than the second connection portions 242a and 242b. Therefore, the first insertion grooves 222a and 222b of the first and second flap bars 220a and 220b connected to the first connection portions 241a and 241b are spaced apart, at predetermined intervals, from the first fastening grooves 291a and 291b of the first and second gear arms 290a and 290b connected to the second connection portions 242a and 242b when viewed in the Y-axis direction. The first and second gear arms 290a and 290b and the first and second flap bars 220a and 220b can maintain predetermined folding angles therebetween even when the first and second flap bars 220a and 220b rotate about the first protruding portions 221a and 221b. Therefore, as described below with reference to FIG. 5B, during the out-folding operation, the second flap bar 220b can be fixed without moving, and a spacing or empty space may not be formed between the display panel 130 and a top surface of the second flap bar 220b. That is, in a un-folded state, the second flap bar 220b, including its curved surface (e.g., convexly curved surface as described above), directly engages the display panel 130, such that no gap is formed by between the second flap bar 220b and the display panel 130.

The bending coupler 230 is disposed outside the mid bar 210 based on the longitudinal direction (Y-axis direction). The bending coupler 230 is connected to the second flap bar 220b and the semicircular disc 250.

With reference to FIG. 3, the bending coupler 230 has a rod shape having a bent middle portion. A bending angle can be about 90°. Therefore, the bending coupler 230 can have an "L" shape based on the unfolding state. The bending coupler 230 includes a second protruding portion 231 provided at one side (e.g., a first side) thereof (e.g., facing the first flap bar 220a) and connected to the first flap bar 220a, and a third protruding portion 232 provided at the other side (e.g., a second side) thereof (e.g., facing the second gear arm 290b) and connected to the semicircular disc 250. Specifically, the second protruding portion 231 protrudes in the Y-axis direction and is connected to the second insertion groove 223b of the second flap bar 220b. The second protruding portion 231 can have a shape protruding toward two opposite sides in the Y-axis direction so that the second protruding portion 231 can be seated in the accommodation space formed in the second insertion groove 223b. The third protruding portion 232 protrudes in the Y-axis direction in which the gear housing 270 is positioned (e.g., towards the gear housing 270 to which it is connected to). The third protruding portion 232 is inserted into a third insertion groove 251 of the semicircular disc 250 and cab rotate in the third insertion groove 251. The semicircular disc 250 can include a semicircular portion and a flat portion, and can resemble a disc that is cut in-half.

The bending coupler 230 controls the rotation of the semicircular disc 250 in accordance with the rotation of the second flap bar 220b. In case that the second flap bar 220b is folded about the first protruding portion 221b that is the rotation axis, the second protruding portion 231 of the bending coupler 230, which is inserted into the second insertion groove 223b of the second flap bar 220b adjacent to the first protruding portion 221b, rotates. Therefore, the semicircular disc 250, which is connected to the third protruding portion 232 of the bending coupler 230, also rotates in accordance with the motion of the bending coupler 230.

The semicircular disc 250 is disposed outside the bending coupler 230 based on the longitudinal direction (Y-axis direction). One surface of the semicircular disc 250 is connected to the bending coupler 230, and the semicircular disc 250 is seated in the gear housing 270 to be described below.

With reference to FIG. 4B, the semicircular disc 250 is provided in the form of a plate having a semicircular (e.g., half circle) shape having a predetermined thickness. The semicircular disc 250 can be a perfect semicircle made by cutting a circle along any diameter. However, the present disclosure is not limited thereto. The semicircular disc 250 can have a shape having a predetermined arc with an obtuse angle. The semicircular disc 250 is seated in a third accommodation portion formed in the gear housing 270.

Specifically, the semicircular disc 250 has the third insertion groove 251, a flat portion 252, and an arc portion 253.

The third insertion groove 251 of the semicircular disc 250 is connected to the third protruding portion 232 formed at the other side of the bending coupler 230. The third insertion groove 251 can be formed at a position spaced apart from the rotation axis of the semicircular disc 250 at a predetermined distance. The third insertion groove 251 is connected to the third protruding portion 232 of the bending coupler 230, such that the semicircular disc 250 can rotate about the rotation axis by a force applied to the third insertion groove 251 by the movement of the bending coupler 230.

The flat portion 252 is one edge (e.g., one surface) of the semicircular disc 250 and can have a planar surface. The mid bar 210 can be disposed on the flat portion 252 of the semicircular disc 250. Specifically, the flat portion 252 supports the mid bar 210 and maintains a parallel state of the mid bar 210 during the in-folding operation of the foldable display device.

The arc portion 253 is the remaining edge of the semicircular disc 250 having a curved arc shape and can have a predetermined radius of curvature. When the semicircular disc 250 is seated in a third accommodation portion 273 of the gear housing 270, the arc portion 253 of the semicircular disc 250 corresponds to a side surface of the third accommodation portion 273. The third accommodation portion 273 of the gear housing 270 can have a circular shape having a diameter substantially equal to a diameter of the semicircular disc 250. In this case, a guide groove, which has a shape recessed inward along the curved surface, can be formed in the arc portion 253. The guide groove formed in the arc portion 253 can be connected to a guide portion 273a having a protruding shape and formed in an inner surface of the third accommodation portion 273 of the gear housing 270. The guide groove formed in the arc portion 253 and the guide portion 273a of the third accommodation portion 273 can have concave-convex structures and engage with each other. Therefore, the semicircular disc 250 can be seated in the third accommodation portion and rotate along the guide portion 273a of the third accommodation portion 273 by means of the guide groove formed in the arc portion 253.

The semicircular disc 250 is rotated by the folding operation of the second flap bar 220b. In case that the second flap bar 220b rotates about the rotation axis of the first protruding portion 221b, the semicircular disc 250 is rotated in the third accommodation portion 273 of the gear housing 270 by the bending coupler 230 connected to the second flap bar 220b. As the semicircular disc 250 rotates, the mid bar 210 configured to support the semicircular disc 250 can move upward or downward. In case that the mid bar 210 is positioned on the arc portion 253 of the semicircular disc 250 during the process in which the semicircular disc 250 rotates, the mid bar 210 can be kept raised in the Z-axis direction. In case that the mid bar 210 is positioned on the flat portion 252 during the process in which the semicircular disc 250 rotates, the mid bar 210 can move downward (e.g., in the Z-direction). That is, the upward and downward movements of the mid bar 210 are implemented by the rotation of the semicircular disc 250. Specific descriptions related to the motion of the semicircular disc 250 and the motion of the mid bar 210 in the in-folding state, the out-folding state, and the unfolding state will be described below with reference to FIGS. 5A to 5D.

The gear housing 270 is disposed outside the mid bar 210, the first flap bar 220a, and the second flap bar 220b based on the longitudinal direction (e.g., Y-axis direction). The gear housing 270 accommodates and protects the first rotary gear 280a, the second rotary gear 280b, the semicircular disc 250, and the spring member 260 and accommodates the end of the mid bar 210. The gear housing 270 provides a space in which the respective components can be protected and operated.

With reference to FIGS. 4C to 4E, the gear housing 270 includes a first accommodation portion 271, the second accommodation portion 272, the third accommodation portion 273, fourth insertion grooves 274a and 274b, and the fifth insertion grooves 275a and 275b.

The first accommodation portion 271 is formed at one side of the gear housing 270 adjacent to the first and second gear arms 290a and 290b in the longitudinal direction (e.g., Y-axis direction) and accommodates the first and second rotary gears 280a and 280b. The fourth insertion grooves 274a and 274b are formed in the first accommodation portion 271 and receive the first and second rotary gear 280a and 280b.

The second accommodation portion 272 is formed at one side of the gear housing 270 adjacent to the mid bar 210, the first flap bar 220a, and the second flap bar 220b in the longitudinal direction (e.g., Y-axis direction) to completely accommodate the spring member 260 and accommodate a part of the mid bar 210. The second accommodation portion 272 has a shape extending in the thickness direction (e.g., Z-axis direction) so that the mid bar 210 inserted into the second accommodation portion 272 can move upward or downward. The second accommodation portion 272 has a bottom surface on which the mid bar 210 can be supported in the in-folding state. The mid bar 210 and the spring member 260 are sequentially stacked on the bottom surface of the second accommodation portion 272.

The third accommodation portion 273 is formed in the gear housing 270 and disposed at one side of the gear housing 270 at which the second accommodation portion 272 is formed. The third accommodation portion 273 accommodates the semicircular disc 250. The third accommodation portion 273 has a cylindrical shape corresponding to a diameter and a thickness of the semicircular disc 250 so that the semicircular disc 250 can circularly rotate while being accommodated in the third accommodation portion 273. In particular, the third accommodation portion 273 can have the guide portion 273a on which the semicircular disc 250 is seated, and the semicircular disc 250 is easily rotated circularly. That is, an outer diameter of the third accommodation portion 273 (e.g., the guide portion 273a can be larger than a diameter of the guide portion of the third accommodation portion 273. As described above, the guide portion 273a of the third accommodation portion 273 and the guide groove of the arc portion 253 of the semicircular disc 250 are connected to each other, and the semicircular disc 250 is seated in the third accommodation portion, such that the semicircular disc 250 can rotate along the guide portion 273a of the third accommodation portion 273 by means of the guide groove. That is, the guide portion 273a of the third accommodation portion 273 can have a smaller diameter than other portions of the third accommodation portion 273, and further, the guide portion 273a can engage the groove of the arc portion 253a of the semicircular disc 250.

Meanwhile, the third accommodation portion 273 is formed to connected to the second accommodation portion 272. With respect to FIG. 4D, an upper portion of the third accommodation portion 273 having a cylindrical shape is connected to and overlaps the second accommodation portion 272. Therefore, a stepped portion is formed between the third accommodation portion 273 and the second accommodation portion 272. That is, the third accommodation portion 273 having a cylindrical shape is formed first in the Y-axis direction from one side of the gear housing 270, and then the second accommodation portion 272 having a rectangular parallelepiped shape is connected to the third accommodation portion 273. The stepped portion between the third accommodation portion 273 and the second accommodation portion 272 can be formed to correspond to the flat portion 252 of the semicircular disc 250 when the semicircular disc 250 is seated in the third accommodation portion 273 and the flat portion 252 is positioned upward.

The spring member 260 is disposed in the second accommodation portion 272 of the gear housing 270 and disposed in the fixing groove 212 formed in the top surface of the mid bar 210. The spring member 260 transmits downward pressure to the mid bar 210. In case that the mid bar 210 is moved upward by the rotation of the semicircular disc 250, the spring member 260 transmits pressure so that the mid bar 210 can be restored to an original position.

With reference to FIG. 3, the first rotary gear 280a and the second rotary gear 280b are disposed in the first accommodation portion 271 of the gear housing 270. The first rotary gear 280a and the second rotary gear 280b can be completely accommodated in the gear housing 270. The first rotary gear 280a and the second rotary gear 280b serve as rotary shafts that rotate the first and second gear arms 290a and 290b connected to the first and second set housings 110 and 120. With reference to FIG. 3, an edge portion (e.g., edge portion in the lateral direction) of each of the first and second rotary gears 280a and 280b can have a circular cross-section, and a central portion (e.g., central lateral portion in the Y-direction) of each of the first and second rotary gears 280a and 280b can have teeth. The first rotary gear 280a and the second rotary gear 280b can be disposed to engage (e.g., mesh) with each other. One side of the first rotary gear 280a and one side of the second rotary gear 280b are respectively connected to the fourth insertion grooves 274a and 274b formed in the first accommodation portion 271. The other side of the first rotary gear 280a and the other side of the second rotary gear 280b are respectively connected to second fastening grooves 292a and 292b formed in the first and second gear arms 290a and 290b. Meanwhile, FIG. 3 illustrates that the two rotary gears are configured as two-axis gears. However, the present disclosure is not limited thereto. For example, four rotary gears can be provided as four-axis gears.

The first gear arm 290a and the second gear arm 290b are disposed outside the first rotary gear 280a and the second rotary gear 280b based on the longitudinal direction (e.g., Y-axis direction). The first and second gear arms 290a and 290b connect the hinge assembly 200 and the first and second set housings 110 and 120 so that the first and second set housings 110 and 120 are folded or unfolded about the hinge assembly 200.

With reference to FIG. 3, the first and second gear arms 290a and 290b include the first fastening grooves 291a and 291b respectively connected to the first and second couplers 240a and 240b, the second fastening grooves 292a and 292b respectively connected to the first and second rotary gears 280a and 280b, and third fastening grooves 293a and 293b respectively connected to the first and second set housings 110 and 120.

The first fastening grooves 291a and 292b of the first and second gear arms 290a and 290b are respectively connected to the first and second flap bars 220a and 220b through the first and second couplers 240a and 240b. Therefore, the other side portion of the first flap bar 220a and the other side portion of the second flap bar 220b can be rotated by the motions of the first and second gear arms 290a and 290b.

When the first rotary gear 280a and the second rotary gear 280b rotate about the pair of rotation axes, the first gear arm 290a and the second gear arm 290b can rotate together with the first rotary gear 280a and the second rotary gear 280b. In this case, the centers of the second fastening grooves 292a and 292b can be the rotation axes of the first and second gear arms 290a and 290b.

In addition, the third fastening grooves 293a and 293b of the first and second gear arms 290a and 290b can be respectively fastened to the first fastening part 116 of the first set housing 110 and the second fastening part 126 of the second set housing 120, such that the set housings and the other constituent elements accommodated in the set housings can be folded or unfolded on the basis of whether the hinge assembly 200 operates.

Hereinafter, the structures and operations of the main constituent elements of the hinge assembly at the time of folding or unfolding the foldable display device 100 will be described in detail with reference to FIGS. 5A to 5C.

FIG. 5A is a cross-sectional view taken along line I-I' in FIG. 2 and illustrating the unfolding state of the foldable display device according to the embodiment of the present disclosure. FIG. 5B is a schematic cross-sectional view illustrating the out-folding state of the foldable display device according to the embodiment of the present disclosure. FIG. 5C is a schematic cross-sectional view illustrating the in-folding state of the foldable display device according to the embodiment of the present disclosure. FIG. 5D is a schematic cross-sectional view illustrating a shape of the display panel in the in-folding state of the foldable display device according to the embodiment of the present disclosure.

FIG. 5A illustrates that the foldable display device is in the unfolding state, i.e., the first and second set housings are completely unfolded at an angle of 180°.

With reference to FIG. 5A, the first and second set housings are completely unfolded at an angle of 180°. Therefore, the first and second gear arms 290a and 290b connected to the first and second set housings are also completely unfolded at an angle of 180°, and the first and second flap bars 220a and 220b are unfolded to be flat by means of the first and second couplers 240a and 240b connected to the first and second gear arms 290a and 290b. In this case, the bending coupler 230 connected to one side portion of the second flap bar 220b allows the semicircular disc 250 to be positioned at the right side in the third accommodation portion of the gear housing 270. As illustrated in FIG. 5A, as the arc portion 253 of the semicircular disc 250 is positioned at the right side, one end of the arc portion 253 is positioned at the upper side based on the Z-axis direction, and the arc portion 253 of the semicircular disc 250 is positioned at the lower side of the mid bar 210 and supports the mid bar 210. That is, the mid bar 210 is supported upward by the arc portion 253 of the semicircular disc 250 positioned at the lower side, such that the mid bar 210 is disposed on the same plane as the first and second flap bars 220a and 220b adjacent to the mid bar 210. Therefore, the mid bar 210 and the first and second flap bars 220a and 220b can define a substantially flat top surface. The display panel 130 positioned on the first and second support bodies 112 and 122, the mid bar 210, and the first and second flap bars 220a and 220b can be kept flat.

FIG. 5B illustrates that the foldable display device is in the out-folding state, e.g., the first and second set housings are completely folded rearward so that the display panel is disposed outward.

With reference to FIG. 5B, the first and second set housings are each folded downward at about 90° based on the unfolding state illustrated in FIG. 5A so that the display panel 130 is disposed outward. As illustrated in FIG. 5B, the first and second gear arms 290a and 290b connected to the first and second set housings are also folded downward at about 90°, and the first and second flap bars 220a and 220b are also folded downward (e.g., in the Z-direction) at about 90° by means of the first and second couplers 240a and 240b respectively connected to the first and second gear arms 290a and 290b. In this case, as the second flap bar 220b is folded downward about the first protruding portion 221b as the rotation axis, the bending coupler 230 connected to one side portion of the second flap bar 220b moves to the right side. The second protruding portion 231 of the bending coupler 230 connected to one side portion of the second flap bar 220b is positioned to be closer to the rotation axis of the semicircular disc 250 than the first protruding portion 221b to the rotation axis of the semicircular disc 250. Therefore, in case that the second flap bar 220b is folded downward about the first protruding portion 221b as the rotation axis, the bending coupler 230 provides a force to the right side by means of the motion of the second flap bar 220b, and the semicircular disc 250, which receives the force from the bending coupler 230, rotates counterclockwise. Therefore, the semicircular disc 250 is positioned at the upper side in the third accommodation portion of the gear housing 270. As illustrated in FIG. 5B, a part of the arc portion 253 is still positioned below the mid bar 210 even though the arc portion 253 of the semicircular disc 250 rotates. Therefore, the arc portion 253 of the semicircular disc 250 consistently supports the mid bar 210. Therefore, even though the semicircular disc 250 rotates, the mid bar 210 is continuously supported upward by the arc portion 253 of the semicircular disc 250 positioned below the mid bar 210, such that the mid bar 210 is kept in place without being moved upward or downward by elasticity of the spring member 260. In this case, the first and second flap bars 220a and 220b are folded downward, and the display panel 130 performs the out-folding operation in the downward direction at about 90° along the curved surface of one side portion of the first flap bar 220a and the curved surface of one side portion of the second flap bar 220b from the top surface of the mid bar 210.

In this case, the display panel 130 in the folding area is still supported in the central portion of the folding area by the mid bar 210, the display panel 130 can be inhibited from being pushed by external impact and pressure during the out-folding operation. In addition, with reference to FIG. 5B, one side portion of the first flap bar 220a and one side portion of the second flap bar 220b, which are adjacent to the mid bar 210, each have a curved shape C. The two opposite sides of each of the first and second flap bars 220a and 220b each have a rounded quadrangular (rounded rectangle) shape as the first and second flap bars 220a and 220b are folded. Therefore, the display panel 130, which is disposed along the top surfaces of the mid bar 210 and the first and second flap bars 220a and 220b, is folded along the curved shape and also has a curved shape. In this case, high tensile strain is generated at a point on the curved shape C at which the display panel 130 is in contact with the first and second flap bars 220a and 220b, but the curved shape C enables the folding area to be separated from the point to which maximum compressive strain is applied during the in-folding operation. Therefore, the occurrence of cracks and creases in the folding area is minimized even though the out-folding operation is repeatedly performed. That is, the curved shape C reduces strain generated at the display panel 130 to reduce the occurrence of cracks and/or creases during the out-folding operation.

Meanwhile, as described above, during the out-folding operation, one side portion of each of the flap bars 220a and 220b has the curved shape C and has an elliptical arc shape or an arc shape. In case that one side portion of each of the flap bars 220a and 220b has an elliptical arc, a length V in an upward direction (e.g., vertical direction or Z-axis direction) and a length H in a lateral direction (e.g., horizontal direction or X-axis direction), among values of a half of a major axis length of the elliptical arc and values of a half of a minor axis length of the elliptical arc, can satisfy Expression 1 below. In addition, in case that one side portion of each of the flap bars 220a and 220b has an arc, a radius V in the upward direction (e.g., vertical direction or Z-axis direction) and a radius H in the lateral direction (e.g., horizontal direction or X-axis direction) can satisfy Expression 1 below. During the out-folding operation, the stress concentrated on the display panel can vary depending on a size of the edge being in direct contact with the display panel 130.

$$\sqrt{1-\left(\frac{H}{V}\right)^2} = 0 \text{ or } 0.7 \le \sqrt{1-\left(\frac{H}{V}\right)^2} \quad \text{[Expression 1]}$$

In case that the length H in the lateral direction of the length V in the upward direction of the flap bar 220a and 220b satisfy a range of Expression 1 based on the shape during the out-folding operation, the stress applied to the display panel during the out-folding operation can generally decrease. As a result, the performance of the display panel maintained for a long period of time.

Meanwhile, in the foldable display device according to the embodiment of the present disclosure, a parallelogrammatic shape is defined by a first center point of one side portion of the second flap bar at which the second flap bar and the gear housing are connected, a second center point of the second insertion groove at which the second flap bar and the bending coupler are connected, a third center point of the second connection portion at which the second flap bar and the first connection portion of the second coupler are connected, and a fourth center point of the second connection portion at which the second gear arm and the second connection portion of the second coupler are connected.

In other words, based on the second flap bar 220b connected to the bending coupler 230 during the out-folding operation, the foldable display device according to the embodiment of the present disclosure, has the parallelogrammatic shape in which a first point, at which the first protruding portion 221b of the second flap bar 220b and the fifth insertion groove 275b of the gear housing 270 are connected, a second point, at which the second insertion groove 223b of the second flap bar 220b and the second protruding portion 231 of the bending coupler 230 are connected, a third point, at which the first insertion groove 222b of the second flap bar 220b and the first connection portion 241b of the second coupler 240b are connected, and a fourth point, at which the second connection portion 242b of the second coupler 240b and the first fastening groove 291b of the second gear arm 290b are connected, are always constant. Therefore, the folding angle of the second gear arm 290b and the folding angle of the second flap bar 220b can be always equally maintained. Therefore, during the out-folding operation, the second flap bar 220b is fixed without moving, and a spacing or empty space is not formed between the display panel 130 and the top surface of the second flap bar 220b. Therefore, the durability against external impact and pressure during the out-folding operation can be significantly improved.

Figure 5C:
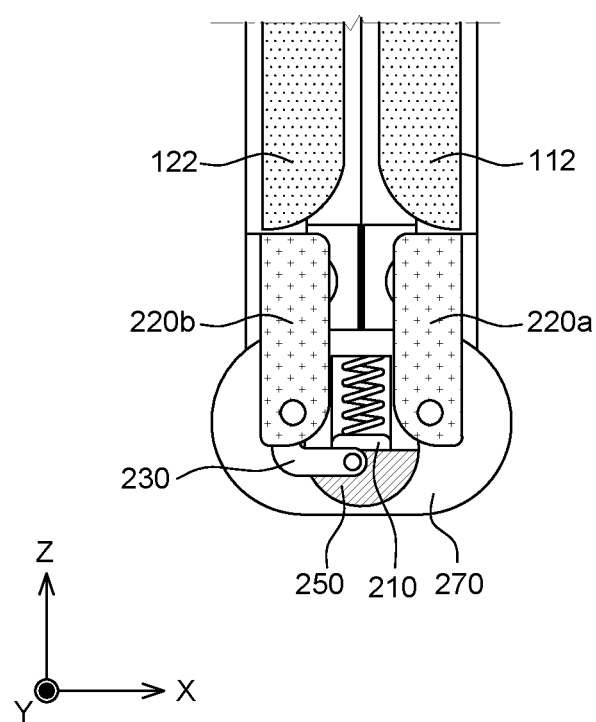
FIG. 5C is a schematic cross-sectional view illustrating an in-folding state of the foldable display device according to the embodiment of the present disclosure.
Figure 5D:
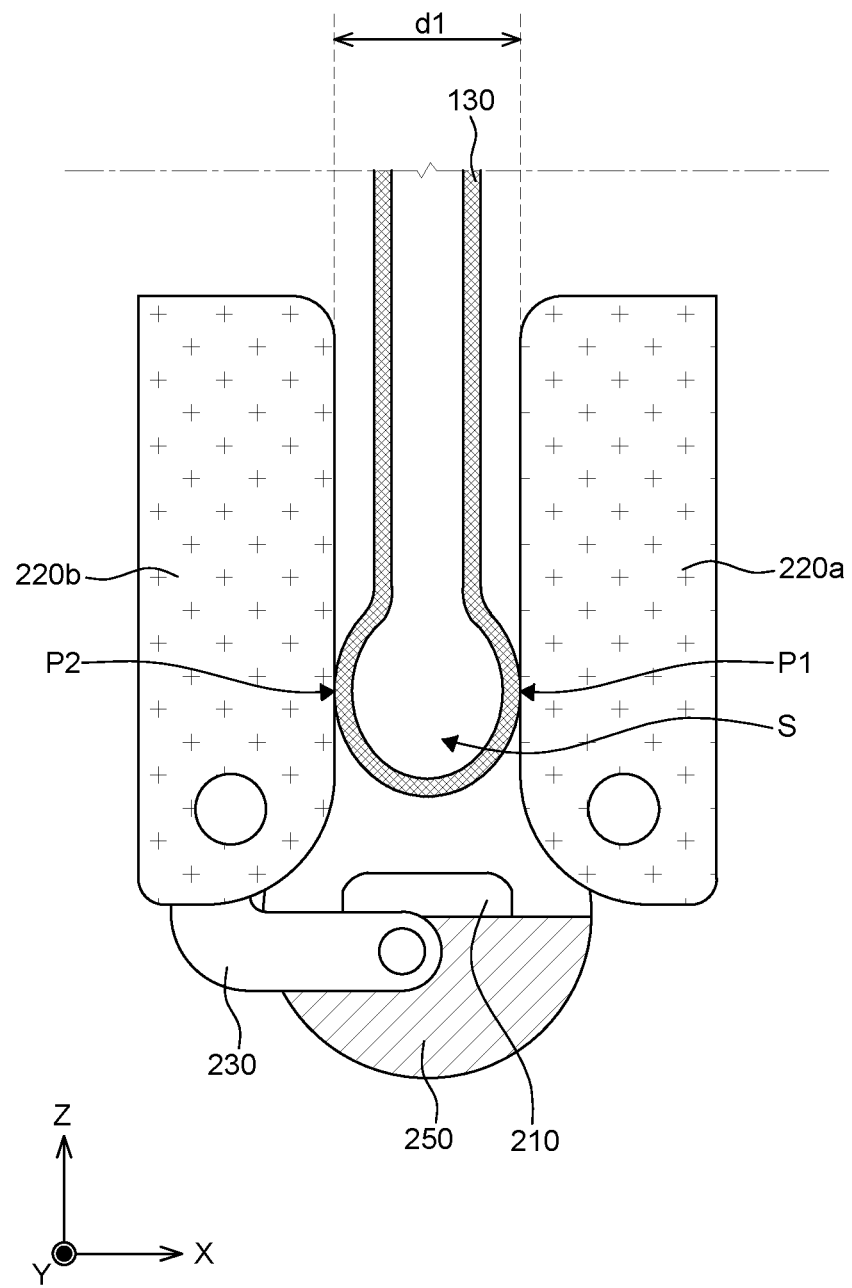
FIG. 5D is a schematic cross-sectional view illustrating a shape of a display panel in the in-folding state of the foldable display device according to the embodiment of the present disclosure.

FIG. 5C illustrates that the foldable display device is in the in-folding state, i.e., the first and second set housings are completely folded so that the display panel is disposed inward.

With reference to FIG. 5C, the first and second set housings are each folded upward at about 90° based on the unfolding state illustrated in FIG. 5A so that the display panel 130 is disposed inward. As illustrated in FIG. 5C, the first and second gear arms 290a and 290b connected to the first and second set housings are also folded upward at about 90°, and the first and second flap bars 220a and 220b are also folded upward at about 90° by means of the first and second couplers 240a and 240b respectively connected to the first and second gear arms 290a and 290b. In this case, as the second flap bar 220b is folded upward about the first protruding portion 221b as the rotation axis, the bending coupler 230 connected to one side portion of the second flap bar 220b moves to the left side. Specifically, the second protruding portion 231 of the bending coupler 230 connected to one side portion of the second flap bar 220b is positioned to be closer to the rotation axis of the semicircular disc 250 than the first protruding portion 221b to the rotation axis of the semicircular disc 250. Therefore, in case that the second flap bar 220b is folded upward about the first protruding portion 221b as the rotation axis, the bending coupler 230 provides a force to the left side by means of the motion of the second flap bar 220b, and the semicircular disc 250, which receives the force from the bending coupler 230, rotates clockwise. Therefore, the semicircular disc 250 is positioned at the lower side in the third accommodation portion of the gear housing 270. As illustrated in FIG. 5C, as the semicircular disc 250 rotates clockwise, the arc portion 253 of the semicircular disc 250, which supports the mid bar 210, is positioned to be directed downward, and the flat portion 252 of the semicircular disc 250 is positioned to be directed upward. As the arc portion 253 of the semicircular disc 250, which supports the mid bar 210, is directed downward, the mid bar 210 is moved downward by elasticity (e.g., elastic force) f of the spring member 260. Therefore, the mid bar 210 is supported by the bottom surface of the second accommodation portion of the gear housing 270 or the flat portion 252 of the semicircular disc 250 and positioned at the lower side in comparison with FIGS. 5A and 5B. In this case, the first and second flap bars 220a and 220b are folded upward.

With reference to FIG. 5D, the mid bar 210 is positioned at the lower side in the state in which the foldable display device is in the in-folding state. Therefore, the first support body 112, the second support body 122, the mid bar 210, and the first and second flap bars 220a and 220b can define a space S in the in-folding state, and the display panel 130 can be disposed in an omega (Ω) shape. In case that the display panel 130 is folded in an omega (Ω) shape, a radius of curvature can increase, such that the stress applied to the folded display panel 130 can be reduced.

Meanwhile, with reference to FIG. 5D, in the in-folding state, an interval d1 between a first contact point P1, at which the first flap bar 220a and the display panel 130 are in contact with each other, a second contact point P2, at which the second flap bar 220b and the display panel 130 are in contact with each other, i.e., an interval d1 between the top surface of the first flap bar 220a and the top surface of the second flap bar 220b can be 3.5 mm to 4.5 mm or 3.8 mm to 4.2 mm. In this case, to fold the display panel 130 in an omega (Ω) shape, a distance between the top surface of the first support body 112 and the top surface of the second support body 122 can be 1.8 mm to 2.2 mm. Meanwhile, with reference to FIG. 5B, in the out-folding state, a distance d2 between the top surface of the first flap bar 220a and the top surface of the second flap bar 220b can be 11 mm to 13 mm or 11.5 mm to 12.5 mm. In this case, the stress applied to the display panel 130 having the omega (Ω) shape can be reduced.

In case that a size of the omega (Ω) shape of the display panel 130 in the in-folding state is reduced by adjusting the interval between the first and second flap bars 220a and 220b, the stress applied to the display panel 130 in the in-folding state can be reduced at the point at which the display panel 130 comes into contact with the first and second flap bars 220a and 220b during the out-folding operation. More specifically, with reference to FIG. 5B, during the out-folding operation in which the first and second flap bars 220a and 220b rotate downward and the display panel 130 is disposed outward, the first and second flap bars 220a and 220b are folded downward, and one side portion of the first flap bar 220a and one side portion of the second flap bar 220b are each maintained to have the curved shape C instead of an angled shape. In this case, the display panel 130 performs the out-folding operation downward along the curved shape C defined by the first and second flap bars 220a and 220b. The display panel 130 is in direct contact with the curved shape C formed by one side portion of the first flap bar 220a and one side portion of the second flap bar 220b and folded at a great angle on this point, such that a large amount of stress is concentrated on the portions where the display panel 130 and the first and second flap bars 220a and 220b are in contact with one another. In this case, during the out-folding operation, high compressive strain is applied to the portions where the display panel 130 and the first and second flap bars 220a and 220b are in contact with one another during the in-folding operation, and the portions can be damaged in case that the in-folding operation and the out-folding operation are repeatedly performed on the display panel 130.

Therefore, it can be ascertained that in a foldable display device according to another embodiment of the present disclosure, in case that the interval d1 between the top surface of the first flap bar 220a and the top surface of the second flap bar 220b in the in-folding state and the distance d2 between the top surface of the first flap bar 220a and the top surface of the second flap bar 220b in the out-folding state satisfy the above-mentioned numerical value range, the compressive strain applied, during the in-folding operation, to the portions where the display panel 130 and the first and second flap bars 220a and 220b are in contact with one another during the out-folding operation is reduced.

The exemplary embodiments of the present disclosure can also be described as follows:

According to an aspect of the present disclosure, there is provided a foldable display device. The foldable display device comprises a display panel, a first set housing and a second set housing disposed to face each other in a first direction and respectively supporting two different portions of the display panel, and a hinge assembly disposed between the first set housing and the second set housings and configured to fold and unfold the first set housing and the second set housing. The hinge assembly comprises a mid bar disposed between the first set housing and the second set housing and having a shape extending in a second direction perpendicular to the first direction, a first flap bar disposed between the first set housing and the mid bar, a second flap bar disposed between the second set housing and the mid bar, a bending coupler having a bent rod shape and having one side connected to the second flap bar, a semicircular disc connected to the other side of the bending coupler and including a flat portion having a planar surface, and an arc portion having a curved arc surface, the semicircular disc being configured to rotate about a rotation axis, a gear housing configured to accommodate the semicircular disc and accommodate an end of the mid bar, a spring member disposed at the end of the mid bar and accommodated in the gear housing, a first coupler and a second coupler respectively including first connection portions protruding toward the first flap bar and a second flap bar in the second direction, and second connection portions protruding in a direction opposite to the direction of the first connection portions in the second direction, and a first gear arm and a second gear arm coupled respectively with the second connection portion of the first coupler and the second connection portion of the second coupler.

Each of the first set housing and the second set housing can comprise a support body disposed below the display panel, a frame disposed at an edge of the support body, and a fastening part provided on the frame. The fastening part of the first set housing can be fastened to the first gear arm, and the fastening part of the second set housing can be fastened to the second gear arm.

One side portion of each of the first flap bar and the second flap bar adjacent to the mid bar can be connected to the gear housing, the other side portion of the first flap bar adjacent to the first set housing can be connected to the first connection portion of the first coupler, and the other side portion of the second flap bar adjacent to the second set housing can be connected to the first connection portion of the second coupler.

The other side portion of each of the first flap bar and the second flap bar can rotate about one side portion of each of the first flap bar and the second flap bar as a rotation axis.

The second flap bar can have a second insertion groove formed to be concave in the first direction in one side portion of the second flap bar adjacent to the mid bar so that the second insertion groove is connected to a protruding portion formed at one side of the bending coupler, and one side of the bending coupler can rotate about the second insertion groove as a central axis.

A central axis of the first connection portion and a central axis of the second connection portion can be different from each other, and a rotation axis of one side portion of the second flap bar can be different from a central axis of the second insertion groove.

The foldable display device can further comprise a first rotary gear and a second rotary gear respectively coupled to the first gear arm and the second gear arm. The gear housing can comprise a first accommodation portion formed to be directed toward the first gear arm and the second gear arm and configured to accommodate the first rotary gear and the second rotary gear, a second accommodation portion formed to be directed toward the first flap bar and the second flap bar and configured to accommodate the spring member and the end of the mid bar, and a third accommodation portion formed to be directed toward the first flap bar and the second flap bar and configured to accommodate the semicircular disc. The second accommodation portion and the third accommodation portion can be connected to each other.

The second accommodation portion can have a shape extending in a thickness direction so that the mid bar moves upward or downward. The third accommodation portion can have a cylindrical shape having a predetermined diameter so that the semicircular disc circularly rotates. A stepped portion can be formed between the second accommodation portion and the third accommodation portion so that the mid bar is supported on a bottom surface of the second accommodation portion.

The semicircular disc can further comprise a third insertion groove configured to be connected to a protruding portion formed at the other side of the bending coupler. The arc portion can be disposed to correspond to an inner surface of the third accommodation portion.

The arc portion of the semicircular disc can have a guide groove having a shape recessed inward along a curved surface. A guide portion can be formed on the inner surface of the third accommodation portion and have a shape protruding along the inner surface of the third accommodation portion so that the guide connected is connected to the guide groove.

In an unfolding state in which the display panel is disposed flat, the semicircular disc can be positioned such that the arc portion is adjacent to the first flap bar, and the mid bar can be disposed to be in contact with a part of the arc portion of the semicircular disc.

During an out-folding operation in which the display panel is disposed outward, the semicircular disc can be positioned such that the arc portion is adjacent to the mid bar and the flat portion is directed in an out-folding direction. The mid bar can be disposed to be in contact with a part of the arc portion of the semicircular disc.

During an in-folding operation in which the display panel is disposed inward, the semicircular disc can be positioned such that the flat portion is directed in an in-folding direction. The mid bar can be disposed to be in contact with a part of the flat portion of the semicircular disc by the spring member.

In an in-folding state in which the display panel is disposed inward, the display panel can have an omega (Ω) shape.

A parallelogrammatic shape can be defined in which a first center point of one side portion of the second flap bar, at which the second flap bar and the gear housing are connected, a second center point of the second insertion groove, at which the second flap bar and the bending coupler are connected, a third center point of the first connection portion, at which the second flap bar and the first connection portion of the second coupler are connected, and a fourth center point of the second connection portion, at which the second gear arm and the second connection portion of the second coupler are connected, are always constant.

During an out-folding operation in which the display panel is disposed outward, the parallelogrammatic shape defined by the first center point, the second center point, the third center point, and the fourth center point can be constantly maintained.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device comprising:
a display panel;
a first set housing and a second set housing facing each other in a first direction and respectively supporting two different portions of the display panel; and
a hinge assembly connected between the first set housing and the second set housing, the hinge assembly being configured to fold and unfold the first set housing and the second set housing,
wherein the hinge assembly comprises:
a mid bar disposed between the first set housing and the second set housing and having a shape extending in a second direction perpendicular to the first direction;
a first flap bar disposed between the first set housing and the mid bar;
a second flap bar disposed between the second set housing and the mid bar;
a bending coupler having a bent rod shape and having a first side connected to the second flap bar;
a semicircular disc connected to a second side of the bending coupler, the semicircular disc including:
a flat portion having a planar surface; and
an arc portion having a curved arc surface, the semicircular disc being configured to rotate about a rotation axis;
a gear housing configured to accommodate the semicircular disc and accommodate an end of the mid bar;
a spring member disposed at the end of the mid bar and accommodated in the gear housing;
a first coupler including a first connection portion protruding toward the first flap bar and a second connection portion opposite to the first connection portion;
a second coupler including a first connection portion protruding toward the second flap bar and a second connection portion opposite to the first connection portion;
a first gear arm coupled with the second connection portion of the first coupler; and
a second gear arm coupled with the second connection portion of the second coupler.

2. The foldable display device of claim 1, wherein each of the first set housing and the second set housing comprises:
a support body disposed below the display panel;
a frame disposed at an edge of the support body; and
a fastening part provided on the frame, and
wherein the fastening part of the first set housing is fastened to the first gear arm, and the fastening part of the second set housing is fastened to the second gear arm.

3. The foldable display device of claim 1, wherein a first side portion of each of the first flap bar and the second flap bar adjacent to the mid bar is connected to the gear housing, wherein a second side portion of the first flap bar adjacent to the first set housing is connected to the first connection portion of the first coupler, and
wherein a second side portion of the second flap bar adjacent to the second set housing is connected to the first connection portion of the second coupler.

4. The foldable display device of claim 3, wherein the second side portion of the first flap bar and the second flap bar rotate about the first side portion of the first flap bar and the second flap bar as a rotation axis, respectively.

5. The foldable display device of claim 4, wherein the second flap bar includes a second insertion groove having a concave shape in the first direction in the first side portion of the second flap bar adjacent to the mid bar so that the second insertion groove is connected to a protruding portion formed at a first side of the bending coupler, and
wherein the first side of the bending coupler rotates about the second insertion groove as a central axis.

6. The foldable display device of claim 5, wherein a central axis of the first connection portion and a central axis of the second connection portion are different from each other, and
wherein a rotation axis of the first side portion of the second flap bar is different from a central axis of the second insertion groove.

7. The foldable display device of claim 1, further comprising:
a first rotary gear and a second rotary gear respectively coupled to the first gear arm and the second gear arm,
wherein the gear housing comprises:
a first accommodation portion accommodating the first rotary gear and the second rotary gear;
a second accommodation portion accommodating the spring member and the end of the mid bar; and
a third accommodation portion formed accommodating the semicircular disc, and
wherein the second accommodation portion and the third accommodation portion are connected to each other.

8. The foldable display device of claim 7, wherein the second accommodation portion has a shape extending in a thickness direction to allow the mid bar to move upwards and downwards,
wherein the third accommodation portion has a cylindrical shape having a predetermined diameter so that the semicircular disc circularly rotates, and
wherein a stepped portion is formed between the second accommodation portion and the third accommodation portion so that the mid bar is supported on a bottom surface of the second accommodation portion.

9. The foldable display device of claim 8, wherein the semicircular disc further comprises a third insertion groove configured to be connected to a protruding portion formed at a second side of the bending coupler.

10. The foldable display device of claim 9, wherein the arc portion of the semicircular disc has a guide groove recessed inward along the curved arc surface, and
wherein a guide portion is formed on the inner surface of the third accommodation portion, the guide portion protruding along the inner surface of the third accommodation portion so that the guide portion is connected to the guide groove.

11. The foldable display device of claim 1, wherein in an unfolding state in which the display panel is flat, the semicircular disc is positioned such that the arc portion is adjacent to the first flap bar, and the mid bar is in contact with a part of the arc portion.

12. The foldable display device of claim 1, wherein during an out-folding operation in which the display panel faces outward, the semicircular disc is positioned such that the arc portion is adjacent to the mid bar, the flat portion is directed in an out-folding direction, and the mid bar is in contact with a part of the arc portion.

13. The foldable display device of claim 1, wherein during an in-folding operation in which the display panel faces inward, the semicircular disc is positioned such that the flat portion is directed in an in-folding direction, and the mid bar is in contact with a part of the flat portion of the semicircular disc by the spring member.

14. The foldable display device of claim 1, wherein in an in-folding state in which the display panel faces inward, the display panel has an omega (Ω) shape.

15. The foldable display device of claim 6, wherein a first center point of one side portion of the second flap bar, at which the second flap bar and the gear housing are connected, a second center point of the second insertion groove, at which the second flap bar and the bending coupler are connected, a third center point of the first connection portion, at which the second flap bar and the first connection portion of the second coupler are connected, and a fourth center point of the second connection portion, at which the second gear arm and the second connection portion of the second coupler are connected, are always constant.

16. The foldable display device of claim 15, wherein during an out-folding operation in which the display panel faces outward, a parallelogrammatic shape defined by the first center point, the second center point, the third center point, and the fourth center point is constantly maintained.

17. A foldable display device comprising:
a display panel;
a first set housing supporting a first portion of the display panel;
a second set housing supporting a second portion of the display panel; and
a hinge assembly connected between the first set housing and the second set housing, the hinge assembly being configured to fold and unfold the first set housing and the second set housing, wherein the hinge assembly comprises:
a first gear arm including:
a first fastening groove;
a second fastening groove; and
third fastening grooves connected to the first set housing;
a second gear arm including:
a first fastening groove;
a second fastening groove; and
third fastening grooves connected to the second set housing;
a first rotary gear connected to the second fastening groove of the first gear arm;
a second rotary gear connected to the second fastening groove of the second gear arm, the second rotary gear meshing with the first rotary gear;
a first flap bar connected to the first fastening groove of the first gear arm; and
a second flap bar connected to the first fastening groove of the second gear arm;
a first coupler including:
a first connection portion coupled to a first coupling groove of the first flap bar; and
a second connection portion coupled to the first fastening groove of the first gear arm; and
a second coupler including:
a first connection portion coupled to a first coupling groove of the second flap bar; and
a second connection portion coupled to the first fastening groove of the second gear arm;
a gear housing including:
fourth insertion grooves respectively fixed to the first and second rotary gears; and
fifth insertion grooves respectively fixed to protruding portions of the first and second flap bars;
a semicircular disc accommodated in the gear housing and configured to rotate inside of the gear housing; and
a mid bar disposed between the first flap bar and the second flap bar and accommodated in the gear housing, the mid bar being configured to move in response to a folding and an unfolding operation of the foldable display device.

* * * * *